(12) United States Patent
Asnaashari et al.

(10) Patent No.: US 9,009,397 B1
(45) Date of Patent: *Apr. 14, 2015

(54) STORAGE PROCESSOR MANAGING SOLID STATE DISK ARRAY

(71) Applicant: Avalanche Technology, Inc., Fremont, CA (US)

(72) Inventors: Mehdi Asnaashari, Danville, CA (US); Siamack Nemazie, Los Altos Hills, CA (US)

(73) Assignee: Avalanche Technology, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/073,669

(22) Filed: Nov. 6, 2013

Related U.S. Application Data

(63) Continuation-in-part of application No. 14/040,280, filed on Sep. 27, 2013, and a continuation-in-part of application No. 14/050,274, filed on Oct. 9, 2013.

(51) Int. Cl.
*G06F 12/06* (2006.01)
*G06F 12/02* (2006.01)

(52) U.S. Cl.
CPC ................... *G06F 12/0246* (2013.01)

(58) Field of Classification Search
USPC ........................................................ 711/103
See application file for complete search history.

(56) References Cited

U.S. PATENT DOCUMENTS

| | | | | |
|---|---|---|---|---|
| 2008/0183947 | A1* | 7/2008 | Shone et al. ................... | 711/103 |
| 2008/0320214 | A1* | 12/2008 | Ma et al. ........................ | 711/103 |
| 2012/0203993 | A1* | 8/2012 | Virgin et al. ................... | 711/165 |
| 2012/0266050 | A1* | 10/2012 | Cideciyan et al. ............. | 714/773 |
| 2013/0198311 | A1* | 8/2013 | Tamir et al. .................... | 709/212 |

OTHER PUBLICATIONS

NVMHCI Workgroup, "NVM Express" Oct. 11, 2012 Intel Corporation, Revision 1.1, all pages.*

* cited by examiner

*Primary Examiner* — Kenneth Lo
(74) *Attorney, Agent, or Firm* — Maryam Imam; IPxLaw Group LLP

(57) ABSTRACT

A method of writing to one or more solid state disks (SSDs) employed by a storage processor includes receiving a command, creating sub-commands from the command based on a granularity, and assigning the sub-commands to the SSDs independently of the command thereby causing striping across the SSDs.

28 Claims, 16 Drawing Sheets

| Bytes | Description |
|---|---|
| 63:60 | Command Dword 15 (CDW15): This field is command specific Dword 15. |
| 59:56 | Command Dword 14 (CDW14): This field is command specific Dword 14. |
| 55:52 | Command Dword 13 (CDW13): This field is command specific Dword 13. |
| 51:48 | Command Dword 12 (CDW12): This field is command specific Dword 12. |
| 47:44 | Command Dword 11 (CDW11): This field is command specific Dword 11. |
| 43:40 | Command Dword 10 (CDW10): This field is command specific Dword 10. |
| 39:24 | If CDW0[15] is cleared to '0', then the definition of this field is:<br><br>39:32 — PRP Entry 2 (PRP2): This field contains the second PRP entry for the command or if the data transfer spans more than two memory pages, then this field is a PRP List pointer.<br><br>31:24 — PRP Entry 1 (PRP1): This field contains the first PRP entry for the command or a PRP List pointer depending on the command.<br><br>If CDW0[15] is set to '1', then the definition of this field is:<br><br>39:24 — SGL Entry 1 (SGL1): This field contains the first SGL segment for the command. If the SGL segment is a Data Block descriptor, then it describes the entire data transfer. If more than one SGL segment is needed to describe the data transfer, then the first SGL segment is a Segment, or Last Segment descriptor. Refer to section 4.4 for the definition of SGL segments and descriptor types. |

Fig. 9a

| Bytes | Description |
|---|---|
| 23:16 | If CDW0[15] is cleared to '0', then the definition of this field is:<br><br>23:16 — Metadata Pointer (MPTR): This field contains the address of a contiguous physical buffer of metadata. This field is only used if metadata is not interleaved with the logical block data, as specified in the Format NVM command. This field shall be Dword aligned.<br><br>If CDW0[15] is set to '1', then the definition of this field is:<br><br>23:16 — Metadata SGL Segment Pointer (MSGLP): This field contains the address of an SGL segment which describes the metadata to transfer. This field is only used if metadata is not interleaved with the logical block data, as specified in the Format NVM command. This field shall be Qword aligned. Refer to section 4.4. |
| 15:08 | Reserved |
| 07:04 | Namespace Identifier (NSID): This field specifies the namespace that this command applies to. If the namespace is not used for the command, then this field shall be cleared to 0h. If a command shall be applied to all namespaces on the device, then this value shall be set to FFFFFFFFh. |
| 03:00 | Command Dword 0 (CDW0): This field is common to all commands and is defined in Figure 10. |

Fig. 9b

STORAGE PROCESSOR MANAGING SOLID STATE DISK ARRAY

CROSS-REFERENCE TO RELATED APPLICATIONS

This application is a continuation-in-part of U.S. patent application Ser. No. 14/040,280, filed on Sep. 27, 2013, by Mehdi Asnaashari, and entitled "STORAGE PROCESSOR MANAGING SOLID STATE DISK ARRAY" and a continuation-in-part of U.S. patent application Ser. No. 14/050,274, filed on Oct. 9, 2013, by Mehdi et al., and entitled "STORAGE PROCESSOR MANAGING NVME LOGICALLY ADDRESSED SOLID STATE DISK ARRAY", the disclosures of both of which are incorporated herein by reference as though set forth in full.

BACKGROUND OF THE INVENTION

1. Field of the Invention

This invention relates generally to solid state disks and particularly to addressing schemes used by solid state disks.

2. Description of the Prior Art

The popularity of solid state drives (SSDs) and exponential growth of network content has led to emergence of all-flash storage systems, SSD arrays, or storage appliances. These systems or appliances are either directly attached to a server via the Peripheral Component Interconnect Express (PCIe) or Serial Attached SCSI (SAS) or network-attached via a high-speed, high bandwidth network such as a 10 Giga bit Ethernet (10 GbE). These storage units may include an array of one or more SSDs to meet requisite capacity and performance demands.

This popularity has also led to the creation of a Non-Volatile Memory (NVM) Express (NVMe), revision 1.1, Specification, dated Oct. 11, 2012 for Peripheral Component Interconnect Express (PCIe) SSDs.

One of the existing problems facing the foregoing arrangements is a bottle neck created between the host and the storage units in that hosts may not utilize the array of SSDs evenly therefore depriving optimum performance by the SSDs. For general consumer applications, such as hand-held devices, this arrangement works well. However, in more sophisticated applications, such as Redundant Array of Independent Disks (RAID), employing numerous SSDs, the performance of the system is hindered.

Another problem with current techniques is wear leveling. As readily known to those skilled in the art, SSD is addressed by a host using logical block addresses (LBAs) and physical block addresses (PBAs). The LBAs are ultimately correlated with PBAs, the latter of which identifies a physical location within a SSD. To this end, if a series of locations identified by LBAs belonging to a particular set of SSDs in the array are written and re-written and the remaining LBA-identified locations in the rest of SSD in the array are not as frequently written, the SSDs that are written and re-written experience more wear than those that are not written or less frequently written.

Another problem with designing of a storage appliance is the complexity and cost associated with designing the proprietary array of SSDs for use in the storage appliance.

Thus, there is a need for a low-cost high-performance storage appliance with improved performance and wear leveling without spending tremendous effort developing the array of SSDs.

SUMMARY OF THE INVENTION

Briefly, a method includes writing to one or more solid state disks (SSDs) employed by a storage processor. The method includes receiving a command, creating sub-commands from the command based on a granularity, assigning the sub-commands to the SSDs independently of the command thereby causing striping across the SSDs, and creating NVMe command structures for the sub-commands.

These and other objects and advantages of the invention will no doubt become apparent to those skilled in the art after having read the following detailed description of the various embodiments illustrated in the several figures of the drawing.

IN THE DRAWINGS

FIG. 9a shows part of the NVMe submission queue data structure bytes 24 through 62.

FIG. 9b shows rest of the NVMe submission queue data structure bytes 0 through 23.

DETAILED DESCRIPTION OF THE VARIOUS EMBODIMENTS

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the invention. It should be noted that the figures discussed herein are not drawn to scale and thicknesses of lines are not indicative of actual sizes.

Figure 1:
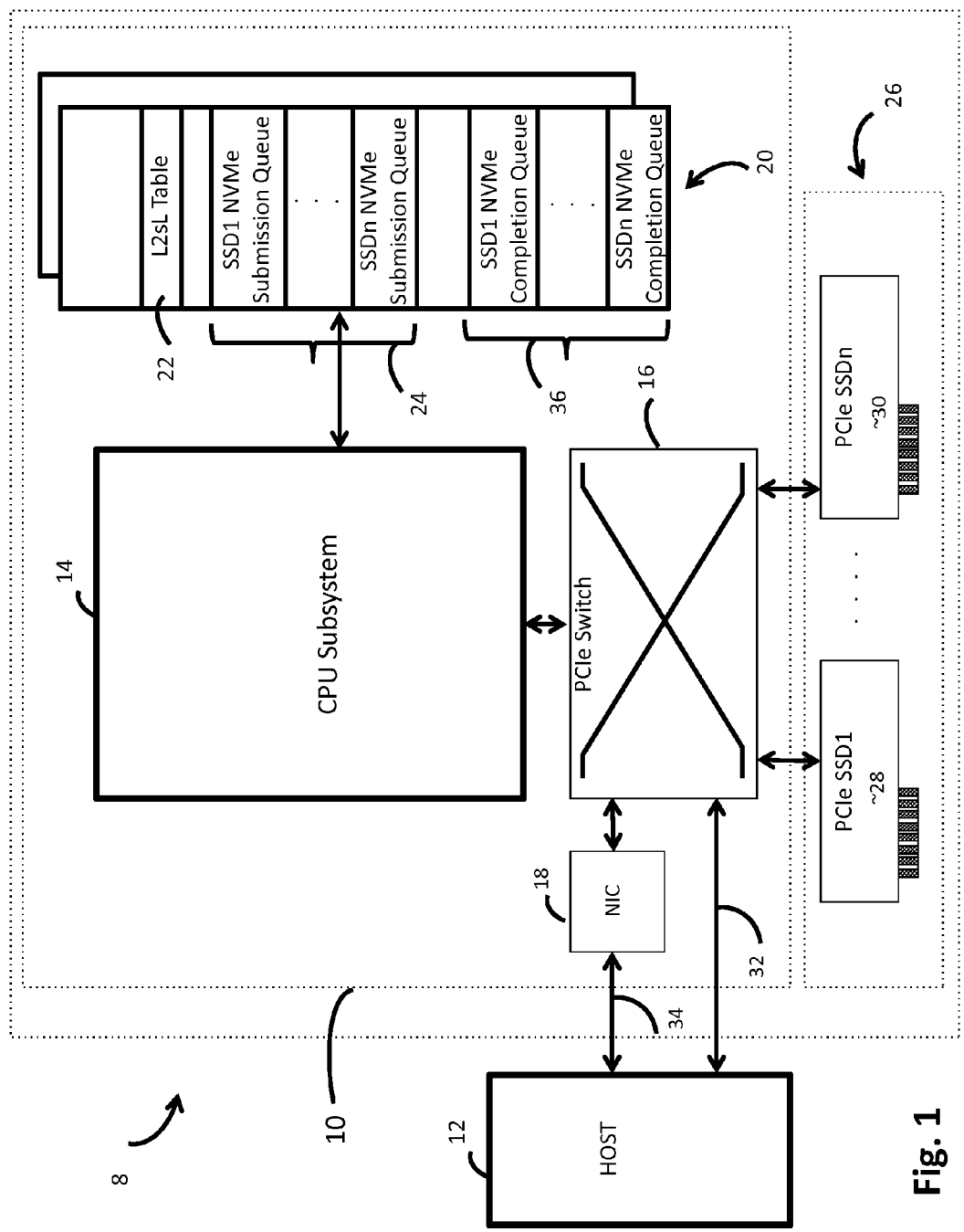
FIG. 1 shows a storage system 8 in accordance with an embodiment of the invention.

Referring now to FIG. 1, a storage system (or "appliance") 8 is shown in accordance with an embodiment of the invention. The storage system 8 is shown to include storage processor 10 and a bank of solid state drives (SSDs) 26. The storage system 8 is shown coupled to a host 12. The SSDs 26 of the storage system 8 are each shown to be a non-volatile memory express (NVM) Express (NVMe) Peripheral Component Interconnect Express (PCIe) solid state disks (SSDs) among a bank of NVMe PCIe SSDs 26. The storage processor 10 is shown to include a CPU subsystem 14, a PCIe switch 16, a network interface card (NIC) 18, and memory 20. The memory 20 is shown to include logical-to-SSD logical (L2sL) table 22, NVMe submission queues 24 and NVMe completion queues 36. The storage processor 10 is shown to further include an interface 34 and an interface 32.

The host 12 is shown coupled to the NIC 18 through the interface 34 and/or coupled to the PCIe switch 16 through the interface 32. The PCIe switch 16 is shown coupled to the bank of NVMe PCIe SSDs 26. The PCIe switch 16 is shown coupled to the bank of NVMe PCIe SSDs 26 which are shown to include 'n' number of NVMe PCIe SSDs or NVMe PCIe SSD 28 through NVMe PCIe SSDn 30 with the understanding that the bank of SSDs 26 may have additional SSDs than that which is shown in the embodiment of FIG. 1. "n" is an integer value. The PCIe switch 16 is further shown coupled to the NIC 18 and the CPU subsystem 14. The CPU subsystem 14 is shown coupled to the memory 20. It is understood that the memory 20 may and typically does store additional information, not depicted in FIG. 1.

In an embodiment of the invention, the memory 20 is volatile, such as dynamic random access memory (DRAM). In other embodiments, part or all of the memory 20 is non-volatile, such as flash, magnetic random access memory (MRAM), spin transfer torque magnetic random access memory (STTMRAM), resistive random access memory (RRAM), or phase change memory (PCM). In still other embodiments, the memory 20 is made of both volatile and non-volatile memory. It is desirable to save the table 22 in non-volatile memory so as to maintain the information that is saved therein even when power is not applied to the memory 20. As will be evident shortly, maintaining the information in memory at all times is of particular importance because the information maintained in the table 22 and queues 24 and 36 is needed for proper operation of the storage system subsequent to a power interruption.

During operation, the host 12 issues a read or a write command along with data in the case of the latter. Information from the host is normally transferred between the host 12 and the storage processor 10 through the interfaces 32 and/or 34. For example, information is transferred through the interface 34, between the processor 10 and the NIC 18. Information between the host 12 and the PCIe switch 16 is transferred using the interface 34 and under the direction of the of the CPU subsystem 14.

In the case where data is to be stored, i.e. a write operation is consummated; the storage processor 10 receives the write command and accompanying data for storage from the host and through the PCIe switch 16. The received data is ultimately saved in the memory 20. The host write command typically includes the starting LBA and the number of LBAs (sector count) that the host intents to write to. The starting LBA in combination with sector count is referred to herein as "host LBAs" or "host provided LBAs". Advantageously, the storage processor 10 or the CPU subsystem 14 maps the host provided LBAs to the bank of NVMe PCIe SSDs 26 in such a way that all SSDs are near evenly utilized.

Prior to the foregoing mapping by the CPU subsystem 14, the host write command is divided into or broken up into one or multiple write commands based on the number LBAs that the host intents to write to and a granularity at which the logical to SSD logical table is maintained. Data striping is the technique of segmenting logically sequential data across different SSDs. The combination of the host-provided starting LBA and the sector count; host LBA, associated with a command is divided into one or more LBAs based on the striping granularity and each divided LBA is associated with a sub-command. For example, a host write command with a starting LBA of 24 and a sector count of 16 is divided into two write sub-commands; one with a starting LBA of 24 and a sector count of 8 and another with a starting LBA of 32 with a sector count of 8. Hence the sector count of 8 is the granularity at which the L2sL table is maintained. In this example, the starting LBA is also a multiple of 8, which is the granularity of the L2sL entries. In this manner, mapping is done using the divided or parsed LBAs.

In the case where the host provides a starting address and/or a sector count and the starting LBA is not a multiple of the striping granularity, some of the write sub-commands do not have a starting LBA address and/or a sector count of the striping granularity. Those sub-commands have to be treated in a different manner. For example, a host write command with a starting LBA of 26 and with a sector count of 18 is divided into three sub-commands; the first sub-command has a starting LBA of 26 and a sector count of 6, a second sub-command and with a starting LBA of 32 and with a sector count of 8, and a third sub-command and with a starting address of 40 and a sector count of 4. In this example, the starting LBA address and the sector count of the first write sub-command and the third write sub-command are less than the striping granularity and are accordingly treated in a different manner, as further described later.

Upon receiving a write command from the host, the command and the data associated with the command are saved is in the memory 20. The storage processor 10 breaks out the received command into multiple sub-commands based on a granularity that is typically the same as, although need not be, the same as the granularity of the L2sL table 22. The storage processor 10 or CPU subsystem 14 re-distribute the host logical block addresses (LBAs) across the bank of NVMe PCIe SSDs 26 in a manner so as to nearly guarantee even utilization of the bank of SSDs 26. A command from the host 12, once received, is generally identified by LBAs, however, these LBAs cannot be used to directly access the data in the SSDs. Instead, SSD LBAs (SLBAs) are used when accessing the bank of SSDs 26.

To prevent uneven use of one or more SSDs, host write commands are each divided into multiple sub-commands and mapped to an unassigned SLBA from each SSD therefore causing distribution of the sub-commands across the NVMe PCIe SSDs. Mapping of the LBAs to SLBAs is maintained in the L2sL table 22. Distributing the random LBAs corresponding to a host write command across multiple SSDs decouples the host LBAs from their final destination SLBAs in SSDs. Mapping of the host LBAs to unassigned SLBAs is done in a manner so as to nearly guarantee even utilization of the bank of SSDs 26. The assignment of the unassigned SLBAs to LBAs following host write commands starts where the previous assignment ended. The L2sL table 22 maintains the relationship between the host LBAs and the SSD LBAs. More specifically, the table 22 includes logical-to-SSD logical addresses (L2sL), as will be discussed in further detail below.

Accordingly, the host is ignorant of the LBA assignments of SSDs and sub-commands are assigned to different SSDs independently of the host.

Ideally, the granularity of the SLBAs matches the granularity of the table 22.

NVMe is a standard with a specification for accessing PCIe SSDs. NVMe is an optimized, high performance, scalable host controller interface with a streamlined register interface and command set designed for enterprise and client systems that use PCI Express SSDs. NVMe reduces latency and provides faster performance. Previously, SSDs were made using the PCIe bus, but using non-standard proprietary interfaces. By standardizing the interface of the SSDs, hosts or operating systems need only one standard driver to work with all SSDs adhering to the same specification. This also means that each SSD manufacturer doesn't have to allocate resources to design specific interface drivers. With the standardization of the NVMe, the PCIe SSDs are becoming readily available from many SSD manufacturers such as Micron Technology, Inc. of San Jose, Calif., Samsung, Inc. of Korea and Intel Inc. of Santa Clara, Calif. Storage systems, or appliance manufacturers, can take advantage of this by employing NVMe PCIe SSDs in their system or appliance. By using a NVMe PCIe SSD, the storage system or appliance manufacturer need not have to allocate resources to design its own SSD cards for use in its appliance and can rather use off-the-shelf SSD drives that are designed for high throughput and low latency. Using off-the-shelf NVMe PCIe SSDs also lowers the cost of manufacturing the system or appliance since multiple vendors are competing to offer similar products.

In accordance with the various embodiments and methods of the invention, the storage appliance takes advantage of SSDs readily available in the marketplace, hence saving the engineering effort currently employed in optimizing utilization of the SSDs.

In one embodiment of the invention, the storage processor 10 serves as a NVMe host for the SSDs 26. The storage processor 10 receives a command form the host 12, divides the command into sub-commands based on the number of SSDs 26 and the striping granularity, and creates the NVMe command structures for each sub-commands in the submission queues of the corresponding SSDs.

In another embodiment of the invention, the storage processor 10 receives a command and associated data form the host 12, divides the command into sub-commands, associating each sub-command with a portion of the data ("sub-data") that belongs to the sub-command based on the number of SSDs 26 and the granularity. Data received from the host and prior to being divided into sub-commands is stored in the memory 20. Storage processor 10 creates the NVMe command structures for each sub-command in the submission queues of the corresponding SSDs with each structure pointing to a sub-data.

In yet another embodiment of the invention, the data is stored in a non-volatile memory portion of the memory 20 and the storage processor 10 informs the host of completion of the write command as soon as the host data is stored in the non-volatile memory.

In some embodiments, host LBAs from multiple commands are aggregated and divided into one or more sub-commands based on a striping granularity. In some embodiments, the multiple commands may have some common LBAs or consecutive LBAs. Practically, the host LBA of each command rather than the command itself is used to create sub-commands. Example of the host LBA is the combination of the starting LBA and the sector count. The host LBA of each command is aggregated, divided into one or more LBAs based on the granularity, and each divided LBA is associated to a sub-command. In an exemplary embodiment, the host LBA of a command is saved in the memory 20.

Figure 2:
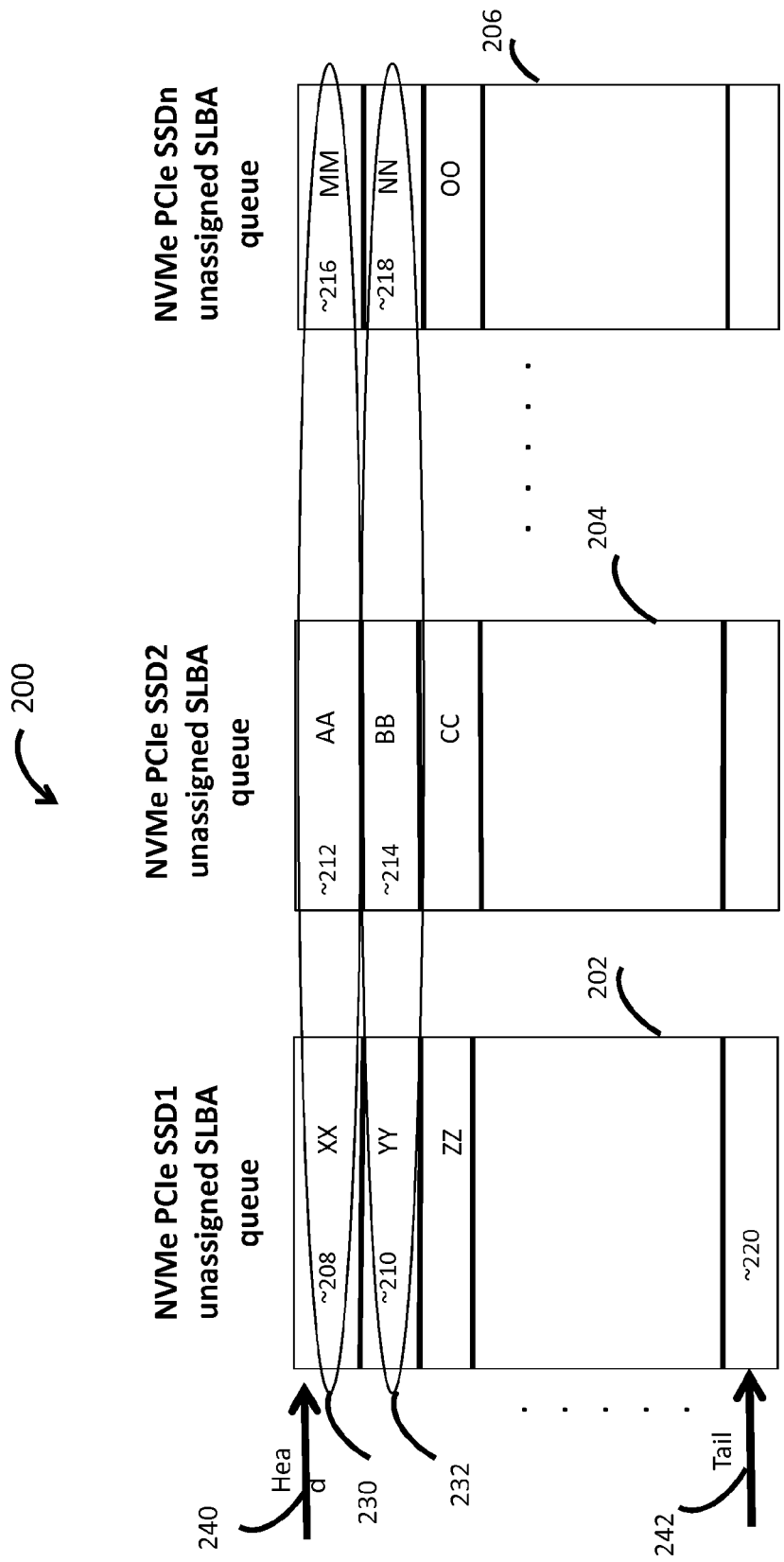
FIG. 2 shows an example of initial mapping unassigned SSD LBA (SLBA) queues used by the storage processor 10 for assignment of LBAs to SLBAs, in accordance with an exemplary embodiment of the invention.

FIG. 2 shows an example of an organization 200 of the information that the CPU subsystem 14 uses to map a random host LBA to one or more SSD LBAs in accordance with an exemplary embodiment of the invention. This information is shown to be organized into queues, in the embodiment of FIG. 2, with each queue shown assigned to a particular SSD. Entries of unassigned SLBA queues 202, 204, and 206 are SSD LBA, which is also referred to herein as "SLBA" and are used by the storage processor 10 or CPU subsystem 14 to map host LBAs. The entries in the queues 202, 204, and 206 in the example of FIG. 2 are the initial values when none of the SSD LBAs have been assigned to any of the host LBAs.

The queue 202, 204, and 206 are each a circular buffer and include a head pointer and a tail pointer. For instance, queue 202 has a head pointer 240 pointing to SSD LBA 208 and a tail pointer 242 pointing to the SSD LBA 220. The head pointer points to the value that should be used by the CPU subsystem 14 to assign to the next host LBA for that particular SSD and the tail pointer points to the last valid value in the queue. In the case where, for example, the head pointer points to the same location as the tail pointer, there are no valid SLBAs left in the queue.

In some embodiments of the invention, the host LBAs of a command are divided and dynamically assigned to SLBAs of the bank of NVMe PCIe SSDs rather than permanently or statically assigned, as done by prior art techniques.

Initially, all the SLBA entries in the queue are available for assignment with the head pointer pointing to the top of the circular queue (or "circular buffer") and the tail pointer pointing to the end of the circular buffer. For example, the top of the circular buffer 202 is the head pointer 240 pointing to the location 208 and the tail pointer 242 points to the end or bottom of the circular buffer 202, at the location 220. As the CPU subsystem 14 assigns SSD LBAs to the host LBAs, the head pointer of a SSD queue moves down to the next unassigned SSD LBA. And as an already assigned SSD LBA becomes invalid (or un-assigned), it is added to the same SSD queue pointed to by the tail pointer plus one. Each of the queues of FIG. 2, i.e. 202-206, are associated with a distinct PCIe SSD. For example, the SSD 28 of FIG. 1 may be assigned to the queue 202 of FIG. 2 and so on.

In one embodiment of the invention, the head pointer entries across the bank of SSDs 26 create a stripe of unassigned SLBAs 230 as shown in FIG. 2. The storage processor 10 or CPU subsystem 14 uses all the unassigned SLBAs within a stripe prior to advancing to the next stripe hence assigning one SSD LBA entry from each SSD to a host sub-command LBA. For instance, CPU subsystem 14 uses the entries "XX" in the location 208 of the queue 202, "AA" in the location 212 of the queue 204, and "MM" in the location 216 in the queue 216 to form the stripe 230 before creating a next stripe 232 and using the next set of unassigned SLBAs, i.e. "YY" 210, and "BB" 214 through "NN" 218. It is understood that while three queues are shown in the example of FIG. 2, a different number of queues is contemplated with the number of queues being generally dictated by the number of NVMe PCIe SSDs employed.

The foregoing host LBA manipulation has a number of benefits, one of which is wear leveling by having the random LBAs from the host mapped to SLBAs that are evenly spread across the bank of SSDs 26. Another benefit is increased performance. Regarding the latter, because the host LBAs are evenly spread across all SSDs, they are evenly employed therefore alleviating scenarios where a small set of SSDs rather than all SSDs within the bank are employed, such as in the case of the host commands targeting a small set of SSDs. By employing all SSDs evenly, bottlenecks are avoided and performance is increased.

Figure 3:
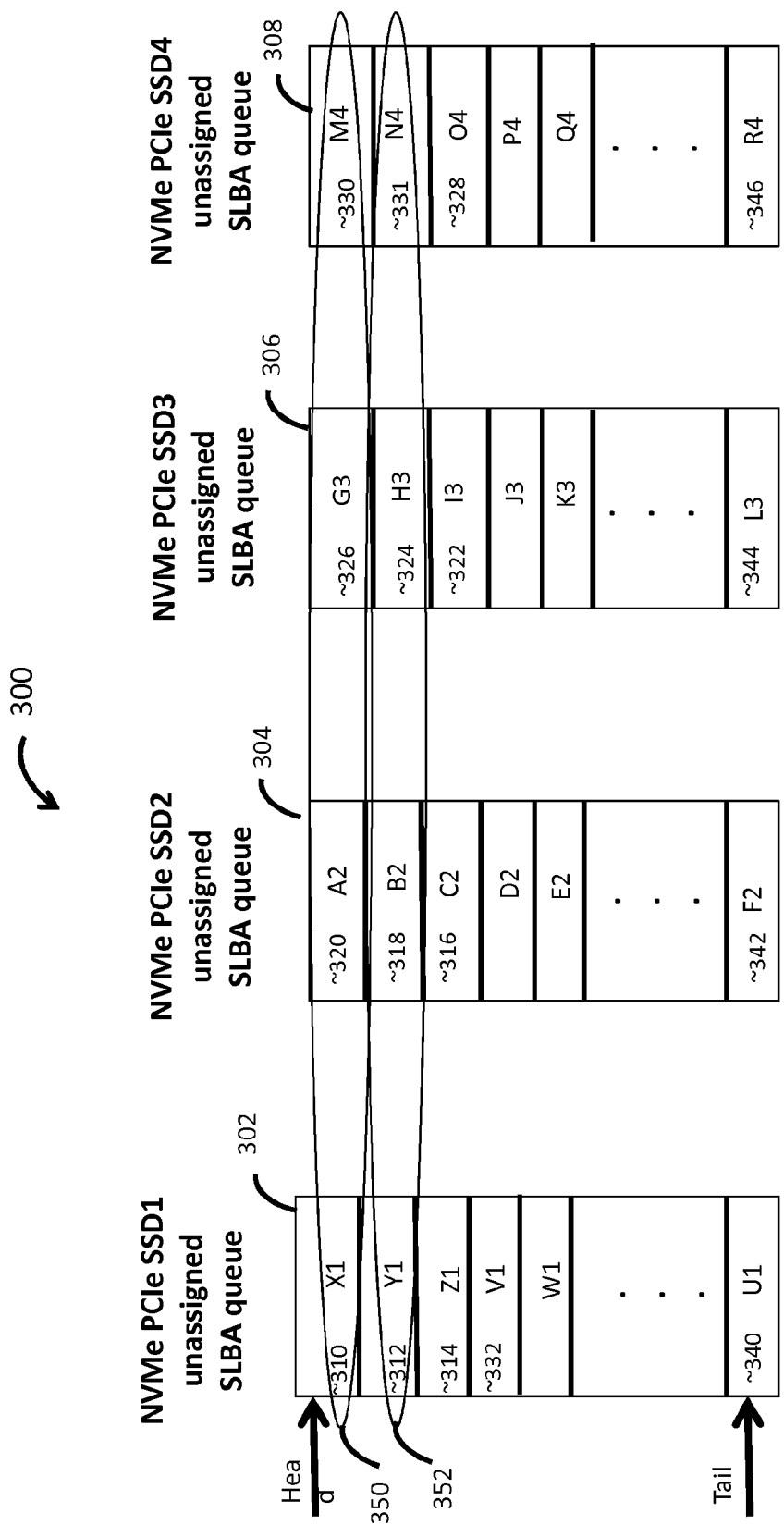
FIG. 3 shows a specific implementation of the example of the FIG. 2 showing four unassigned SLBA queues 302-308, with each queue being assigned to a distinct SSD.

For a better understanding of the tables of FIG. 2, an example is shown in subsequent figures. FIG. 3 shows an exemplary organization 300 of the information where the CPU subsystem 14 maps a host LBA to a particular SSD. In the embodiment of FIG. 3, four queues, queues (or "tables") 302-308, are depicted with each queue being assigned to a distinct SSD. For example, table 302 is assigned to SSD1, table 304 is assigned to SSD2, table 306 is associated to SSD3 and table 308 is associated to SSD4. It is understood that while four tables are shown in FIG. 3, any number of queues and SSDs may be employed.

Each of the queues 302-308 holds unassigned SLBAs for a particular SSD among the bank of PCIe SSD 26 (of FIG. 1). Unassigned SLBAs are those SSD LBAs that have yet to be assigned to a host LBA (LBA provided by the host 12.

In one embodiment of the invention, the CPU subsystem 14 of FIG. 1 maintains the queues 302-308 of FIG. 3. In another embodiment, these queues are maintained in the memory 20 of FIG. 1. In FIG. 3, the queue 302 is shown to have unassigned LBAs 310, 312, 314, and 340 for SSD1.

The storage processor 10 or CPU subsystem 14 maintain the L2sL table 22 (in FIG. 1) which holds the assignment relationship between the host LBAs and SSD LBAs (SLBA). This mapping remains invisible to the host 12 and is used to assure even utilization of the bank of PCIe SSDs 26. In other embodiments of the invention, dedicated hardware or software may maintain these queues or table.

In the example of FIGS. 2 and 3, 'n' represents the number of NVMe PCIe SSDs, "X" represents the granularity of the LBAs and SLBAs that are maintained in the logical-to-SSD-logical (L2sL) table 22 as well as the granularity of the SSD queues 302-308. This is the same granularity as the granularity at which the host commands are striped across the bank of SSDs 26. "Y" represents the number of LBAs in a page of flash memories, which in this example is equal to the granularity of the LBAs maintained in the L2sL table 22. In other examples, as shown and discussed with reference to subsequent figures, X and Y may be different.

Queues 302, 304, 306 and 308 include the SSD LBAs that have not yet been assigned to the host LBAs. Entries X1 310, Y1 312, Z1 314, and U1 340 in queue 302 are the LBAs in SSD1 that have not yet been assigned. Similarly, SLBAs entries A2 320, B2 318, C2 316, and D2 342, in queue 304, are the LBAs in SSD2; SLBAs entries G3 326, H3 324, I3 322 and J3 344 in queue 306 are the LBAs in SSD3; SLBAs entries M4 330, N4 331, O4 328; and P4 346 in queue 308 are the LBAs in SSD4 that have not yet been assigned to any host LBAs.

The head of the queues 302, 304, 306, and 308 in SSD1, SSD2. SSD3, and SSD4, respectively, make up stripe 350. The CPU subsystem 14 uses the SLBAs entries X1 310, A2 320, G3 326, and M4 330 to assign host LBAs. Once all the entries in stripe 350 are exhausted (or have been assigned), a new stripe 352 is formed with SLBAs entries Y1 312, B2 318, H3 324, and N4 331.

In accordance with an embodiment and method of the invention, the storage processor 10 or CPU subsystem 14 assigns SLBAs from each SSD to random host LBAs in a round robin manner to ensure that all four SSDs are used substantially evenly thereby preventing wear of one or more SSDs. This is due in large part to no one SSD being used substantially more than other SSDs. The SLBAs are assigned across the bank of SSDs to host LBAs (also referred to as "striping") rather than pre-assignment of host LBAs to a bank of SSDs as done in prior art techniques. Stated differently, SLBAs are striped across all four SSDs before another striping is performed. In addition to addressing wear leveling, embodiments and methods of the invention cause an increase in the performance of the storage processor 10 by allowing parallel or simultaneous access of the SSDs.

The queues 302-308 are generally saved in the memory 20, shown in FIG. 1.

It is understood that other schemes besides the queuing scheme shown and discussed herein may be employed to maintain the unassigned SLBAs for the bank of SSD 26.

Figure 4:
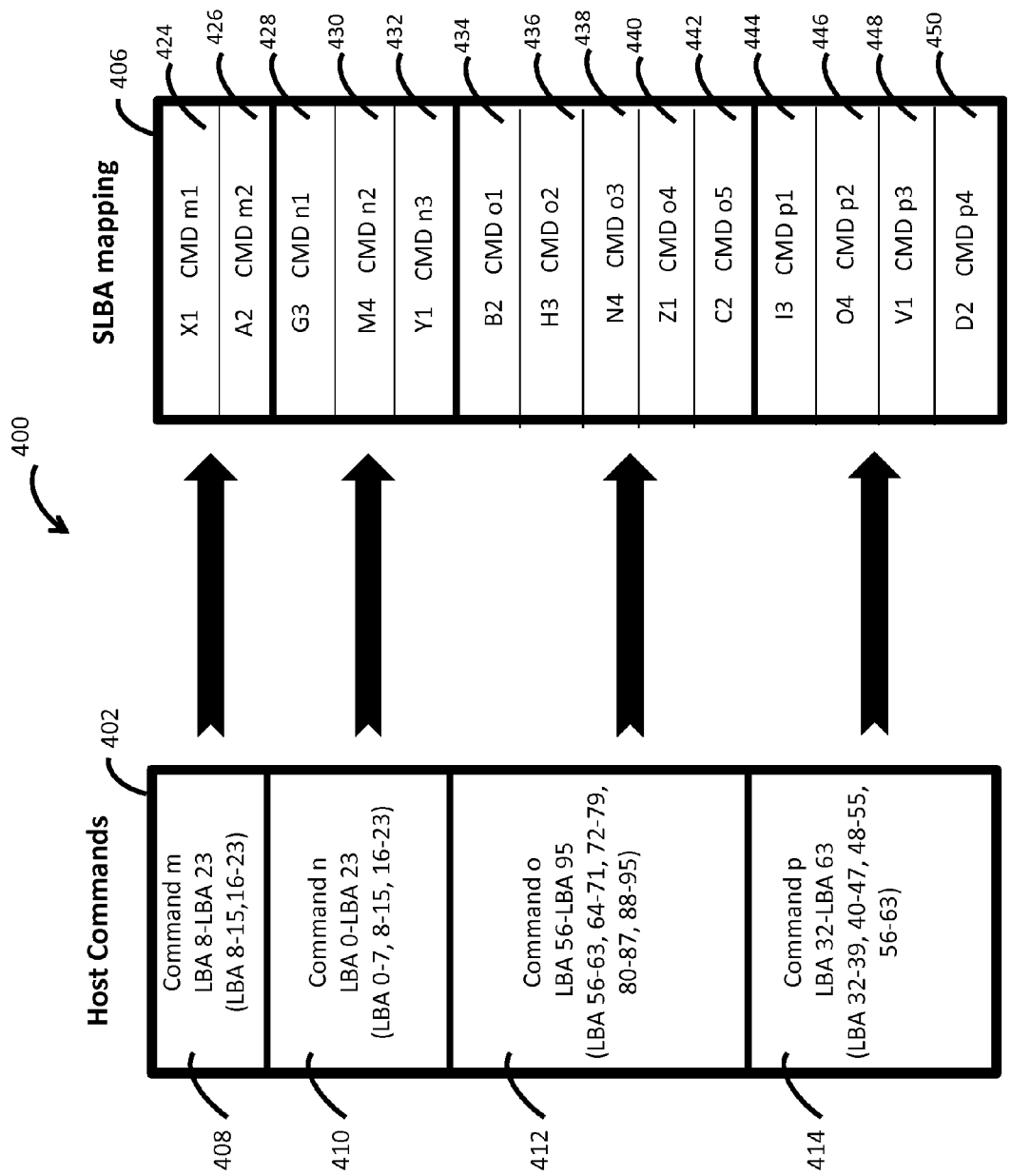
FIG. 4 shows further details of the example of FIG. 3 showing assignments of the host LBAs to SSD LBAs based on specific implementation of example of FIG. 3.

FIG. 4 shows further details of the example of FIG. 3. More specifically, the L2sL table 406, using the example of FIG. 3, is presented. An organization 400 of two tables, tables 402 and 406, is shown in FIG. 4. The host write command table 402 is a table of write commands received from the host by the storage processor 10 (of FIG. 1) and their associated LBAs. Table 406 illustrates an example of how the host write commands are divided into sub-commands and striped across the bank of NVMe PCIe SSDs 26 and how they are mapped to the unassigned SSD LBAs from FIG. 3.

The host commands "m", "n", "o", and "p", each have associated host LBAs. Write commands are initially striped or divided into one or a number of sub-commands at a granularity of the L2sL table, i.e. entries in the tables of FIG. 3. Command m is associated with 16 LBAs, i.e. LBAs 8-23. SLBAs are maintained at a granularity of 8 in a given location within the SLBA table 406. The host LBAs associated with the write command m are divided into two sub-commands m1 and m2 and striped across two NVMe PCIe SSDs, SSD1 and SSD2. Write command n uses 24 LBAs, which are divided into three sub-commands n1, n2, and n3 and striped across 3 NVMe PCIe SSDs; SSD3, SSD4, and SSD1. The sub-commands m1 and m2 are then mapped to unassigned SLBAs X1 and A2 from the stripe 350 of FIG. 3 and sub-commands n1, n2, and n3 are mapped to the next three unassigned SLBAs, two of which are from the stripe 350, i.e. G3 and M4. Once all the entries of the stripe 350 are exhausted and assigned to host LBAs, the next stripe, stripe 352 of FIG. 3, is formed from the head pointers, and sub-command n3 is mapped to the entry Y1. It is worthy to note that some of the host LBAs overlap when the host accesses the same location more than once. For example, command m includes the associated LBA 8-LBA 23 and this same LBA range is also associated with command n. The problem of overwriting is further discussed below.

In this example, a sequential type of algorithm is employed with the SLBAs being sequentially assigned to the host LBAs. However, CPU subsystem 14 or storage processor 10 may choose to employ another algorithm to assign the SLBAs to host LBAs. Also in this example, stripes are shown formed from head pointers of unassigned SLBAs queues and nicely aligned in rows to make the illustration simple. The CPU subsystem 14 or storage processor 10 may choose other algorithms for creating a stripe.

The table 406 is essentially a logical to logical mapping, which maps host LBAs across a bank of SSDs. It maps the host LBAs to SLBAs. For example, the host LBA 8-LBA 15 of write command m in the table 402 is mapped to SLBA X1 424 and the LBA 16-LBA 23 of the same command is mapped to the SLBA A2 426.

Accordingly, unlike host LBAs, the SLBAs are sequentially and evenly assigned to the bank of SSDs thereby ensuring against uneven use of the SSDs.

Because each command can be divided into multiple parts, i.e. sub-commands, the table 406 is used to indicate the location of each part of the command within one or more SSDs.

For example, the SLBA X1 address locations are within the SSD1 and the SLBA A2 address locations are within the SSD2. The SLBA G3, M4 and Y1 span across multiple SSDs, i.e. SSD3, SSD4, and SSD1, respectively. The X1 and A2 span across the SSD1 and SSD2.

Figure 5:
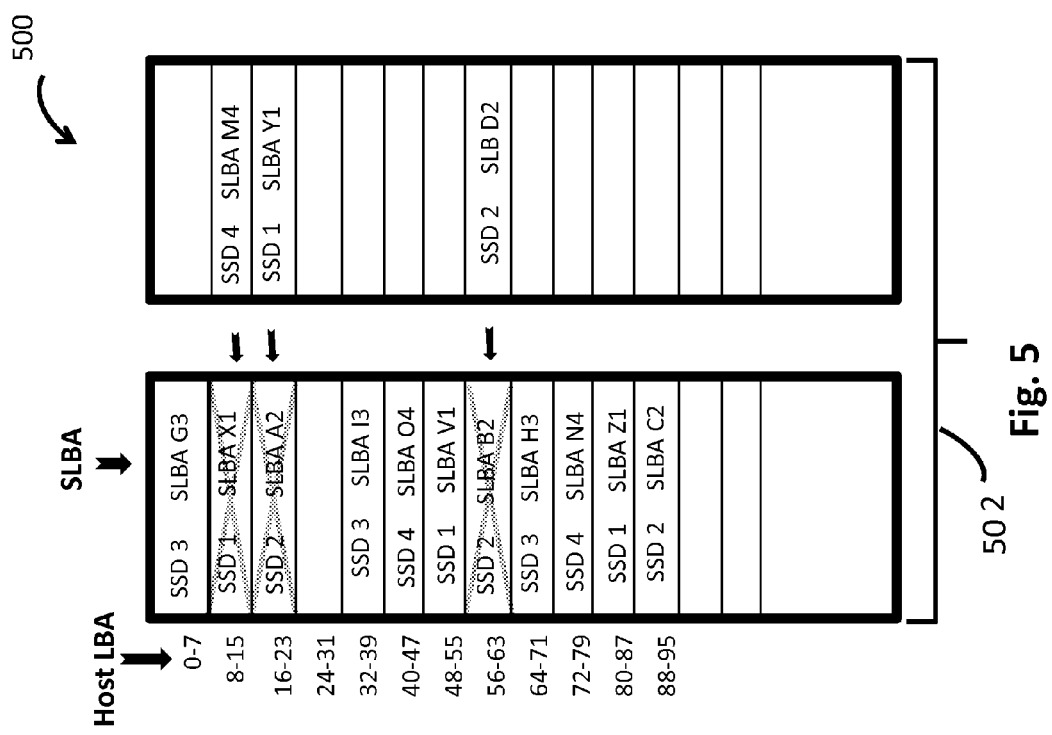
FIG. 5 shows an example of host logical to SSD logical address (L2sL) table on specific implementation of example of FIG. 4.

FIG. 5 shows an example 500 of L2sL table. In FIG. 5, the L2sL table 502, analogous to the table 22 of FIG. 1, is used to keep the mapping relationship of the host LBAs to the SSD LBAs. In one embodiment of the invention, CPU subsystem 14 maintains this relationship.

Referring still to FIG. 5, as previously discussed, command m includes LBAs that are re-written by some of the LBAs of command n. The re-written host LBAs are now associated with a new set of SLBAs that are different than that which was previously used. For example, the LBA 8-15, associated with the command m is mapped to SLBA X1 and rather than causing a re-write of SLBA X1, the LBA 8-15 is written and points to the SLBA M4, as shown in the table 502. Similarly, with regard to the same commands, host LBA 16-LBA 23 are re-written and therefore point to SLBA Y1 instead of SLBA A2. The L2sL table 502 points to the last SLBAs which were previously used to map host LBAs. The L2sL table 502 is updated with the most recent SLBAs assigned to the host LBA and renders the previous SLBAs in that location old or unassigned. Unassigned SLBAs of this example such as X1, A2, and B2 are eventually reclaimed and added to the tail end of their respective unassigned SLBA queue.

Figure 6:
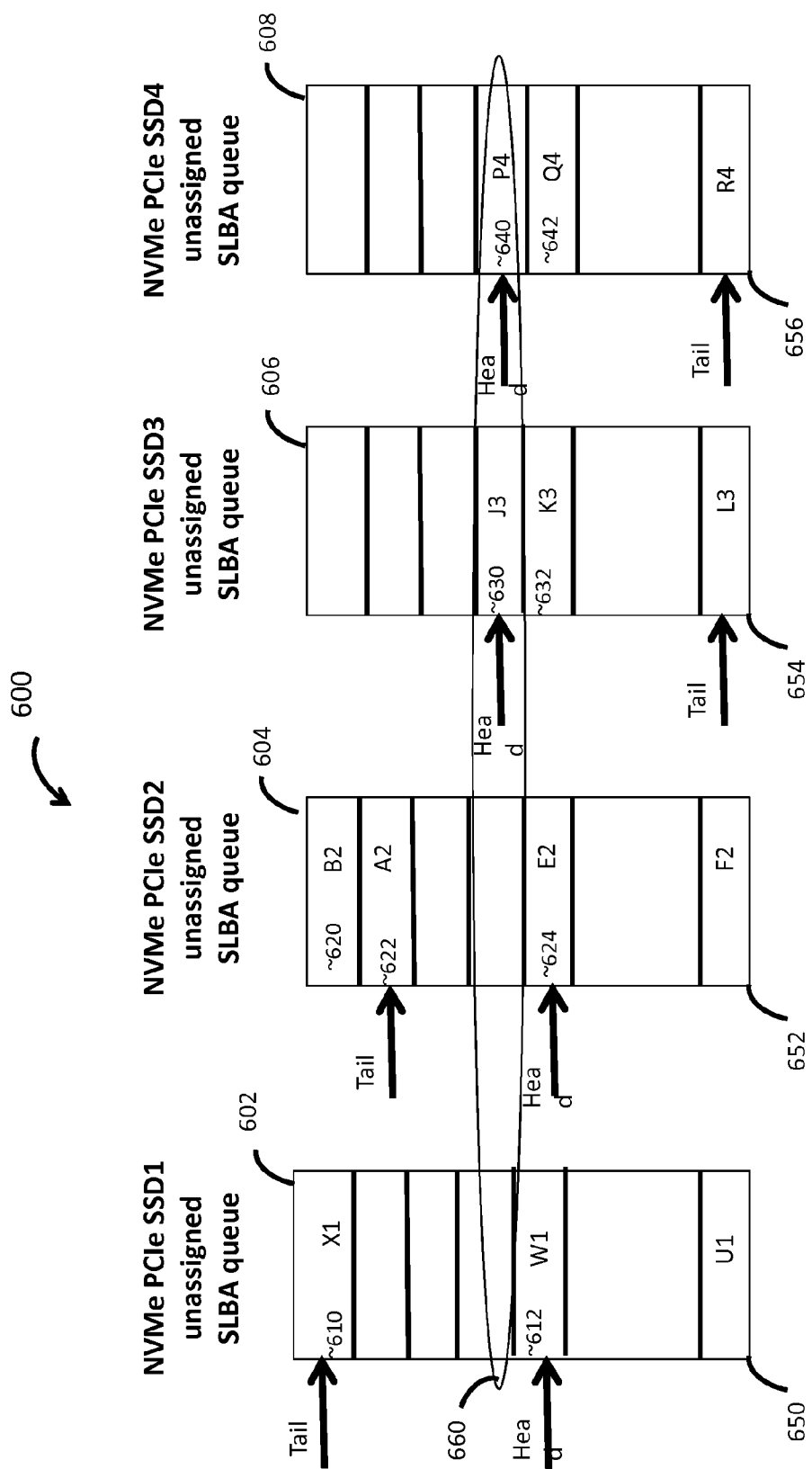
FIG. 6 shows an example of unassigned SLBA queues used by the CPU subsystem for assignment of LBAs to SLBAs after assignment of several LBAs to SLBAs in accordance to example 5.

FIG. 6 shows the SSD unassigned SLBA queues for the bank of 4 NVMe PCIe SSDs of the example of FIGS. 3-5. The head pointer and tail pointer of each queue has moved as the SLBAs are assigned to host LBAs and as old SLBAs are added back to their respective unassigned queues. For example, unassigned SLBA J3 630 in stripe 660 is used by the CPU subsystem 14 for mapping the next host LBA.

Referring still to FIG. 6, in certain cases, a complete stripe across all SSDs cannot be formed because some SSDs within the bank may not have any unassigned SLBAs. In such cases a partial stripe is formed across a subset of NVMe PCIe SSDs, within the bank, and has one or more unassigned SLBA.

Figure 7:
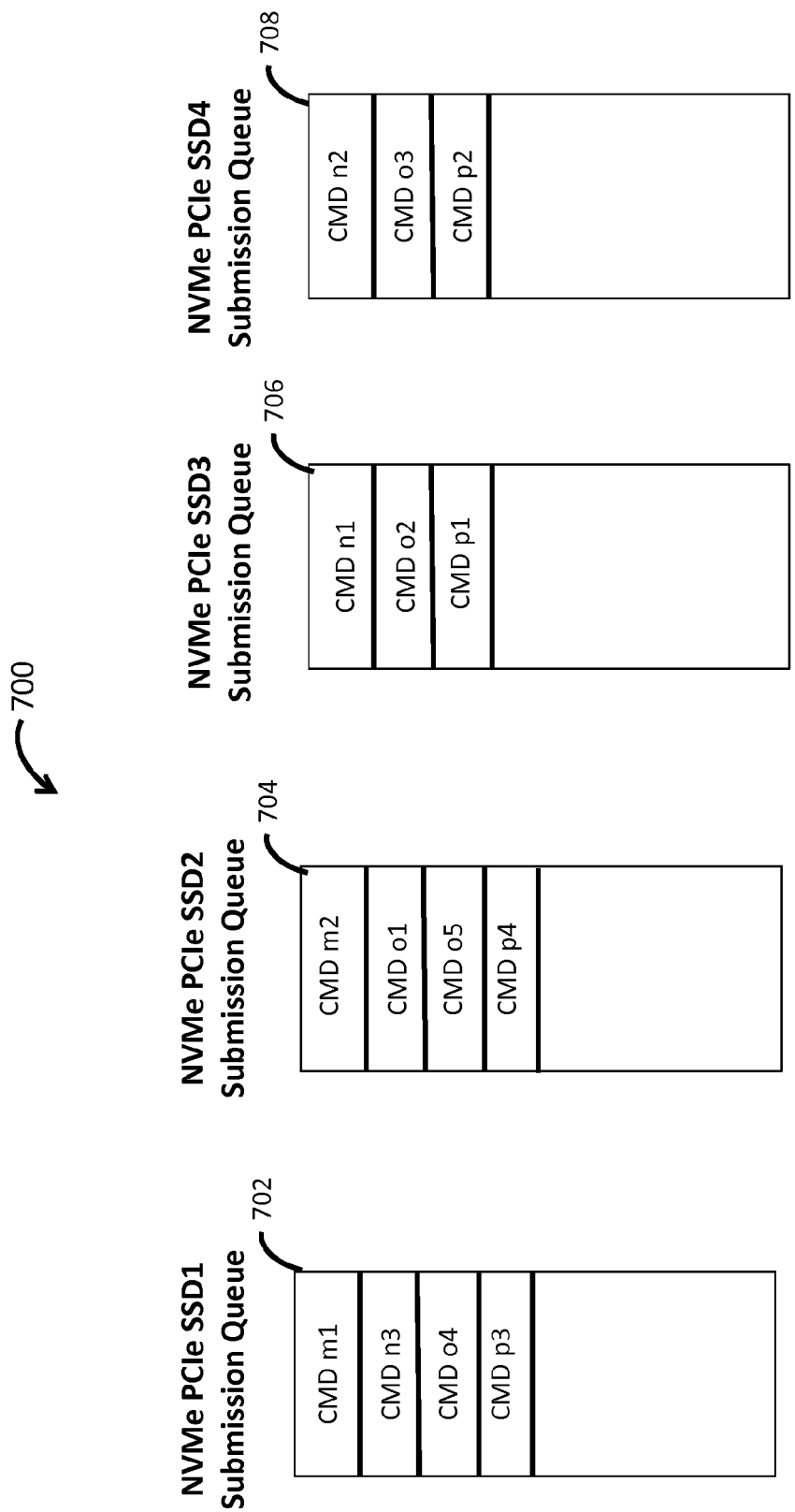
FIG. 7 shows a set of submission queues 700 per NVMe PCIe SSD in accordance with example of FIG. 4.

FIG. 7 shows a set of NVMe submission queues 700 for correlating the sub-commands with SSDs using the example of FIGS. 4 and 5. As shown in FIGS. 4 and 5, a write command is divided to subcommands and striped across multiple SSDs based on the number of LBAs the command calls for and the granularity of the L2sL table. Thus, a command can span across multiple NVMe PCIe SSDs. As such, a single host write command may be divided into multiple sub-commands targeting multiple SSDs. For example, command m is divided into sub-commands m1 and m2, targeting SSD1 and SSD2, respectively. As such, sub-commands m1 and m2 are included in the NVMe submission queues 702 and 704 of SSD1 and SSD2, respectively. Similarly, command n has parts (its sub-commands) in the SSD3, SSD4, and SSD1 and its sub-commands are added to NVMe submission queues 706, 708, and 702, respectively.

In an embodiment of the invention, the tables 700 resides in the memory 20, as shown in FIG. 1. In other embodiments, the tables 600 resides in any suitable location of FIG. 1.

In the event the received LBAs that are associated with a host command do not align with the granularity of the L2sL tables, the storage processor 10 may perform one of a few options. One option is to wait until it receives the remainder of the LBAs to complete the granularity and then assign the complete host LBAs to a SLBA and dispatch the command. Another option is the storage processor 10 to issue a read command to a SSD that contains the host data associated with the host LBAs to complete the granularity and then assign the LBAs to a new unassigned SLBA and dispatch the command. Yet another option is to have the storage processor 10 issue a partial write command to the same SLBA and SSD corresponding to the received host LBA and have the SSD merge the partial SLBA data with the remainder of the data.

Figure 8:
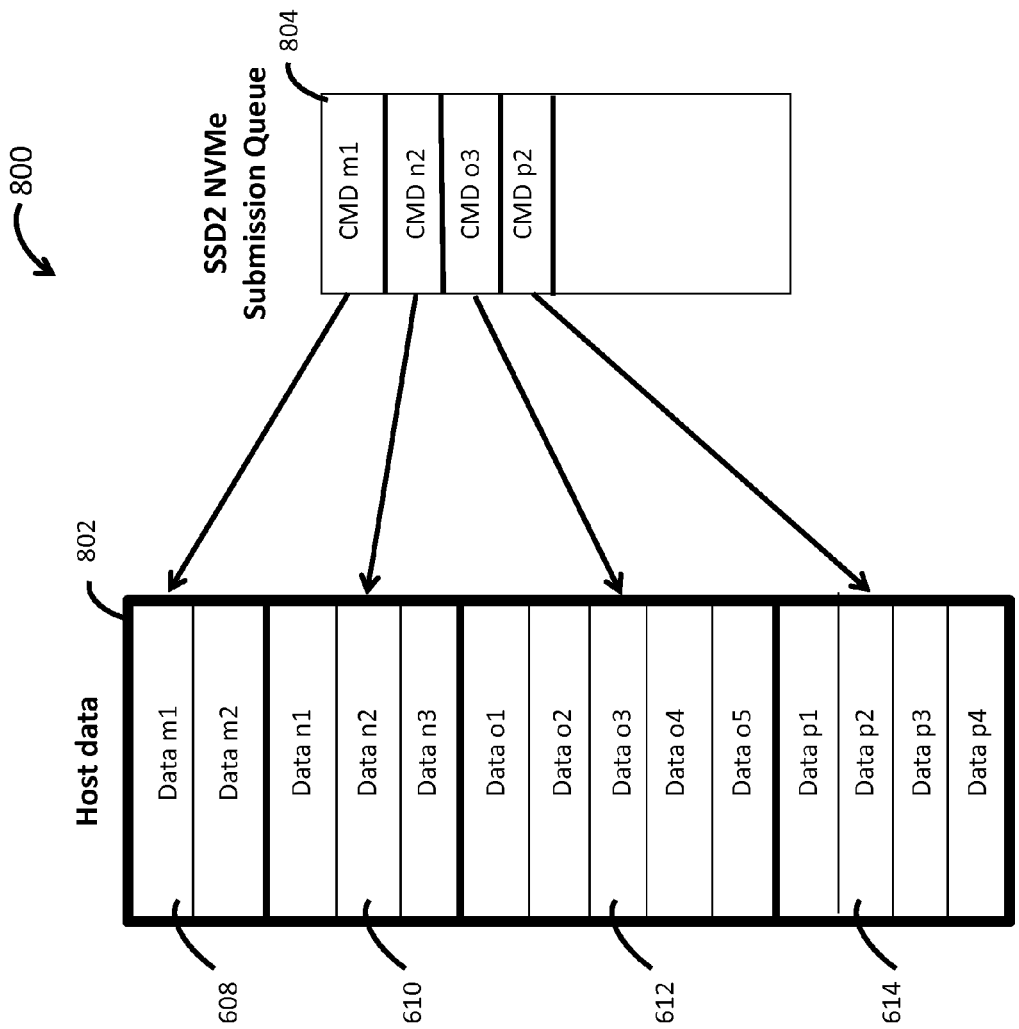
FIG. 8 shows one of the NVMe submission queue for SSD2 in accordance to example 7.

FIG. 8 shows the location of host data in the memory 20 for commands m, n, o, and p. Host data 802 for different commands are also accordingly divided into sub-data based on the granularity and assigned to their corresponding sub-commands. NVMe commands in accordance with the NVMe Specification and standards are created by the storage processor 10 for each sub-command in the submission queues 24 (of FIG. 1) or 604 of the corresponding SSDs with the NVMe command structures pointing to their corresponding sub-data in the memory 20. The example of FIG. 8 further shows the SSD2 NVMe submission queue 804 with sub-data m1 808 corresponding to sub-command m1, sub-data n2 810 corresponding to sub-command n2, sub-data o3 812 corresponding to sub-command o3, and sub-data p2 814 corresponding to sub-command p2.

FIGS. 9a and 9b depict a NVMe command structure, in accordance with the NVMe Specification and standard. Storage processor 10 creates these data structures for all the sub-commands in their corresponding SSD submission queue. Bytes 24 through 39, at 904 in table 900, are used to indicate the location of the sub-data in the memory 20. The NVMe PCIe SSDs uses this information to read the data corresponding to a write command or to write the data corresponding to a read command. The host data shown in table 902 does not have to be in a contiguous address space in the memory 20. The NVMe standard provides scatter/gather provision such that data corresponding to a sub-command can be staggered in different locations of the memory 20 based on space availability in the memory. The CPU subsystem 14, acting as the host for the bank of NVMe PCIe SSDs 26, creates the NVMe command structures by creating a Scatter Gather List (SGL). SGL is used to describe the data in the memory 20.

In an embodiment of the invention, the storage processor 10 attempts to minimize the scattering of the sub-data. Though scattering the data provides flexibility for the storage processor 10 to manage its memory 20, it disadvantageously creates additional processing time for the NVMe PCIe SSDs 26 to gather the list. The storage processor 10 should manage the memory allocation/de-allocation at the granularity of the sub-data to avoid creating SGL and to optimize performance of the bank of NVMe PCIe SSDs. Furthermore, eliminating or minimizing the SGL also reduces the number of memory reads the SSDs have to perform to the memory 20 for reading the list hence reducing the accesses to the memory 20.

Figure 10:
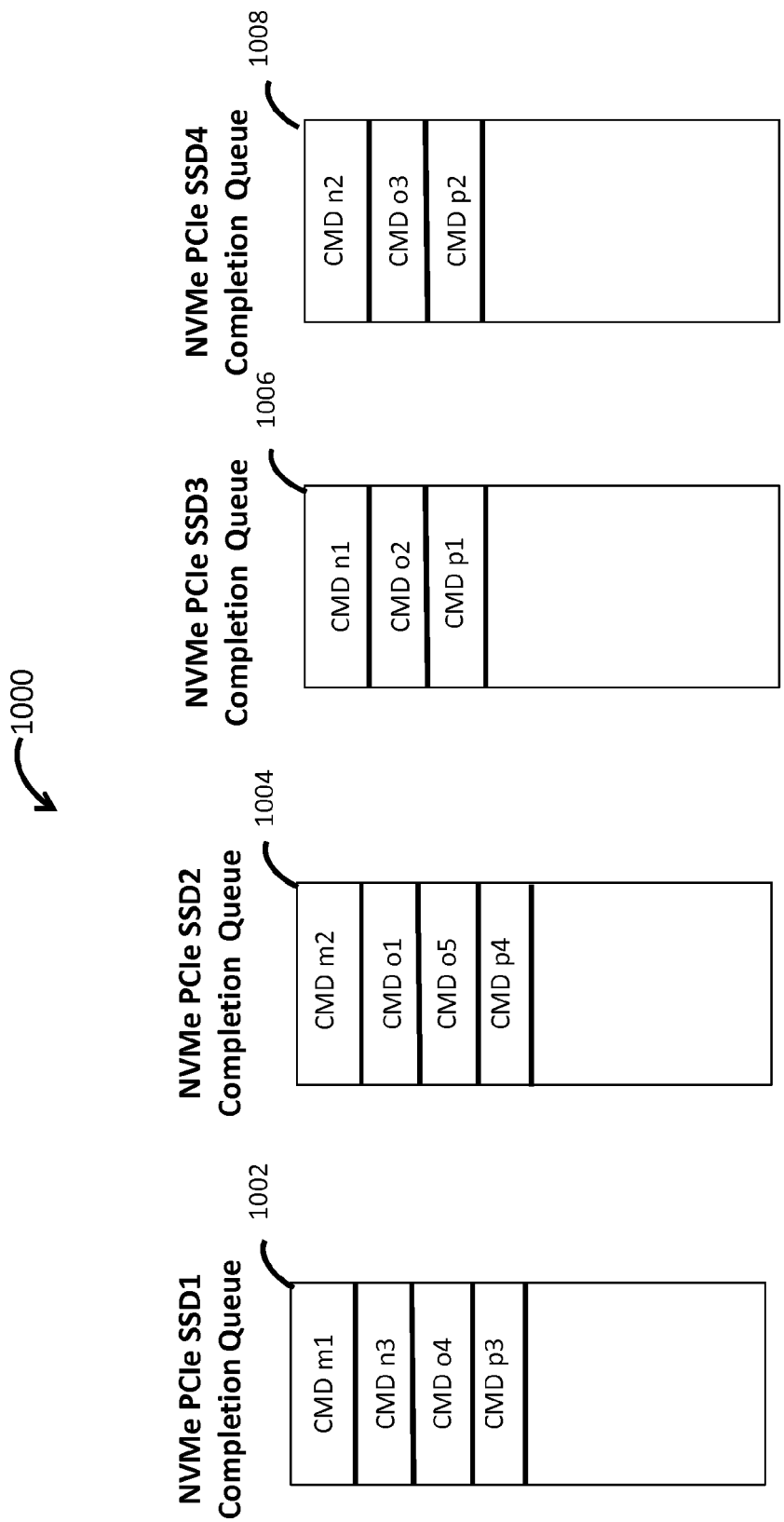
FIG. 10 shows part of the NVMe completion queue for each of the SSDs in accordance to example 5.

FIG. 10 shows an example of NVMe completion queues 1000 in the memory 20. NVMe is based on paired submission and completion queue mechanisms. Commands are placed by the storage processor 10 into the submission queues. Completions are placed into an associated completion queue (for example, the NVMe completion queue 36 of FIG. 1) by the SSDs. Multiple submission queues may utilize the same completion queue. The completion queues are used by the bank of NVMe PCIe SSDs 26 to report the completion and status of the commands fetched by the SSDs from the submission queues.

In one embodiment of the invention and in accordance with the NVMe standard, the storage processor 10 may create multiple submission and completion queues for each of the SSDs in the bank of NVMe PCIe SSDs 26. For example, it may maintain a separate submission queue for write and read commands.

In yet another embodiment of the invention, a round robin arbitration or weighted round robin with urgent priority class arbitration may be employed by the storage processor 10 for the NVMe PCIe SSDs to process commands from each submission queue in accordance with NVMe standards.

In one embodiment of the invention, the striping granularity matches the intended workload in which the storage system 8 is being utilized. Storage appliances are being deployed in different applications requiring high performance; applications such as but not limited to mail servers, databases and indexing. These applications have different workload and input/output (I/O) requirements. Smaller striping granularity may fit one workload better than the others. The host may instruct the storage processor 10 to set the striping granularity accordingly.

In the event the data associated with the striping granularity does not match the flash memory page size, the storage processor 10 stores as many NVMe command structures in the submission queue of a SSD as is needed to fill the entire flash page before storing commands in the submission queue of the next SSD.

To optimize the overall performance of the individual SSDs in the bank of NVMe PCIe SSDs 26, the storage processor 10 stores as many sub-commands in each of the SSD submission queues as it takes to fill the entire flash page. Once enough sub-commands are queued for one SSD to fill its entire flash page, the storage processor dispatches the sub-commands to the SSD in accordance with the NVMe Standard and queues the subsequent sub-commands for the next SSD in the bank of NVMe PCIe SSDs 26.

In some embodiments of the invention, the storage processor 10 or CPU subsystem 14 may queue enough commands for each flash memory, such as the memory 20, to perform a program page multi-plane operation to further improve the performance of the SSDs and the storage system 8. In other embodiments of the invention, storage processor 10 queues and dispatches the SSD sub-commands based on and regardless of the flash page size and allows the individual SSDs to perform the optimization.

Figure 11:
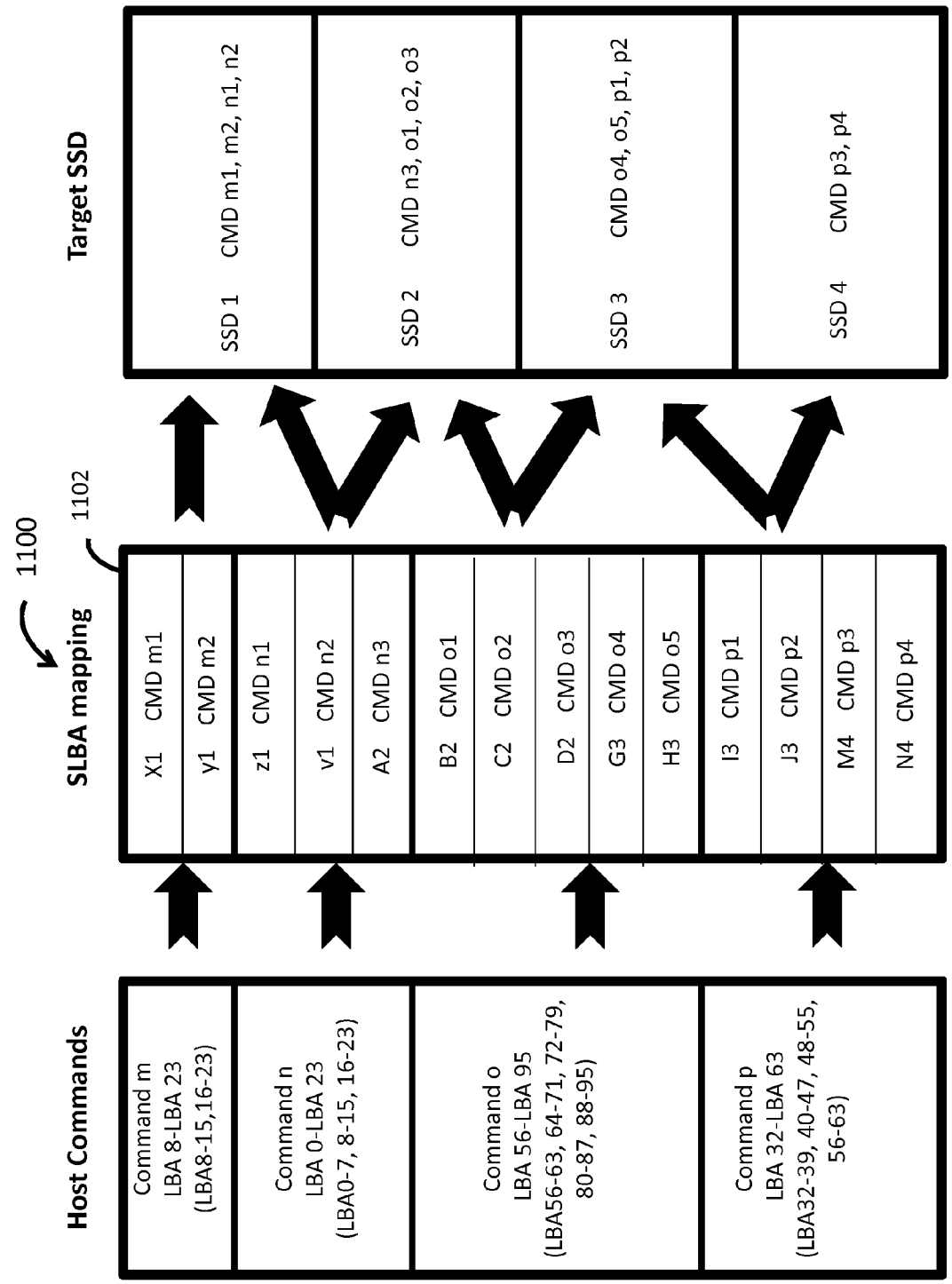
FIGS. 11-12 show another example of a method and apparatus for associating and saving host write commands in SSDs.
Figure 12:
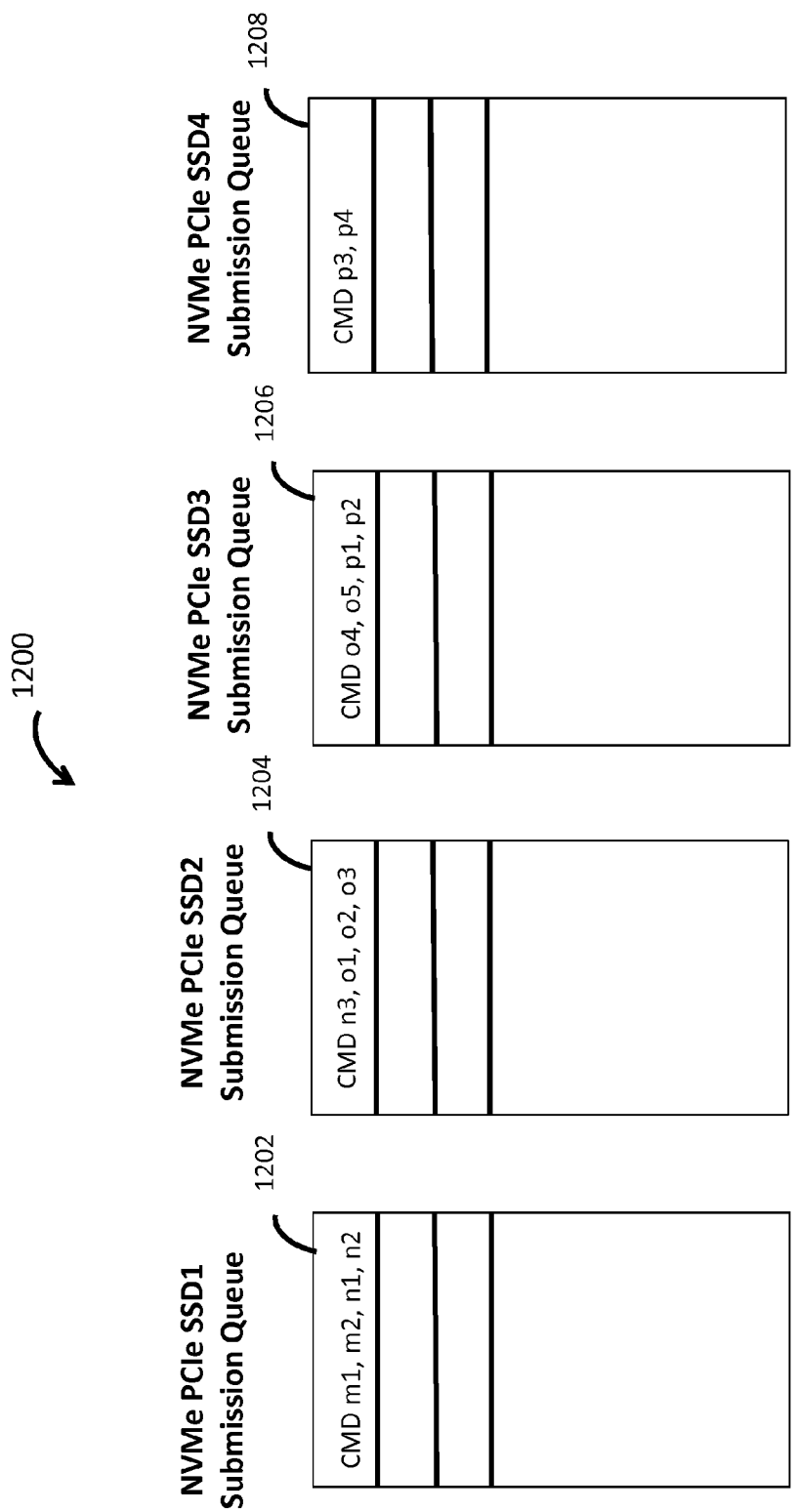

FIGS. 11-12 show another example of a method and apparatus for associating and saving commands in SSDs. In this example, the flash page size, Y is 32 LBAs and the granularity of each entries in the L2sL table, X, is 8. Thus, the flash page size is four times greater than the each entries maintained in L2sL table. To optimize the overall performance of the individual SSDs in the bank of NVMe PCIe SSDs 26, the storage processor 10 stores as many sub-commands in each of the SSD command queues as it takes to fill the entire flash page. Once enough sub-commands are queued for one SSD to fill its entire flash page, the storage processor 10 dispatches the sub-commands to the SSD and queues the subsequent sub-commands for the next SSD in the bank of PCIe SSDs 26.

In the foregoing example, 4 sub-commands are queued per SDD because the flash page size is 4 times greater than the L2sL entries. Since the four sub-commands are being queued for the same SSD, the four unassigned SLBA being assigned to the LBA is drawn from the same unassigned SLBA queue, which corresponds to the SSD.

Referring now to the example on FIG. 11, table 1102, and FIG. 3, unassigned SLBA tables 302, 304, 306 and 308, four SLBAs X1 310, Y1 312, Z1 314, and V1 332 from the SSD1 queue 302 are assigned to striped host LBAs before using SLBAs from the SSD2 queue 304. Once enough sub-commands are queued to fill a page of the flash memory in the SSD, all the sub-commands are dispatched to their respective SSD location at substantially the same time. In the SSD command queues (tables), as shown in FIG. 9, each of the SSD command queues 1202, 1204, and 1206 have enough sub-commands to fill a flash page and are ready to be dispatched to the SSDs. However, the queue 908 does not have enough sub-commands to fill a page hence it is not dispatched.

In another embodiment of the invention, the unassigned queues and L2sL table as well as the submission and completion queues are maintained in the non-volatile portion of the memory 20. These queues and table retain their values in the event of power failure. In another embodiment, the queues and/or table are maintained in a DRAM and periodically stored in the bank of SSDs 26.

In yet another embodiment of the invention, the host data associated with a host write command is stored or cached in the non-volatile memory portion of the memory 20; that is some of the non-volatile memory portion of the memory 20 is used as a write cache. In such case, completion of the write command can be sent to the host once the data is in the memory 20, prior to dispatching the data to the bank of NVMe PCIe SSDs. This is due to the data being in a persistent memory hence the write latency being substantially reduced therefore allowing the host to de-allocate resources that were dedicated to the write command. Storage processor 10, at its convenience, moves the data from the memory 20 to the bank of NVMe PCIe SSDs. In the meanwhile, if the host wishes to access the data that is in the write cache but not yet moved to bank of NVMe PCIe SSDs 26, the storage processor 10 knows to access this data only from the write cache. Thus, host data coherency is maintained.

In other embodiments of the invention, the storage processor 10 keeps track of a number of sub-commands corresponding to a host write command and only de-allocates the portion of the memory 20 that has been allocated to the write command, and other resources associated with the write command, once all the sub-commands are successfully written to the bank of NVMe PCIe SSDs 26.

In another embodiment of the invention, the storage processor 10 keeps track of the number of sub-commands corresponding to a host read command and only transfers the data to the host once all the data associated with the sub-commands are successfully read and transferred to a portion of the memory 20.

In some embodiment of the invention, the storage processor 10 maintains an entry in a status queue corresponding to each entry of the SSD command queue to keep track of sub-command completion. It is understood that a command can be made of a single sub-command.

Figure 13:
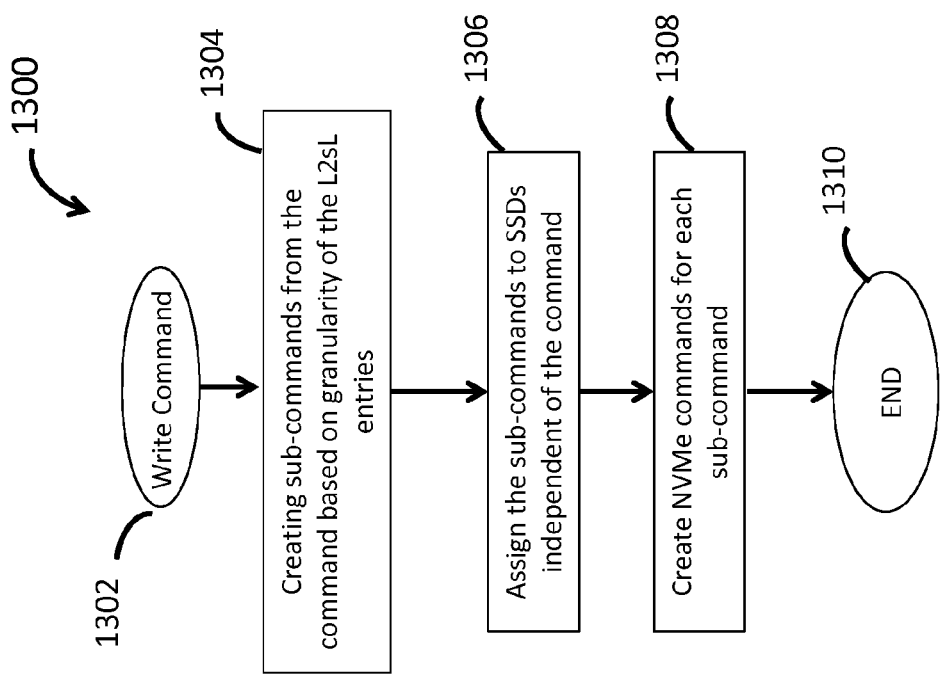
FIG. 13 shows a flow chart 1300 of the relevant steps performed by the storage processor 10 during a write operation, in accordance with a method of the invention.

FIG. 13 shows a flow chart 1300 of the relevant steps performed by the storage processor 10 during a write operation, in accordance with a method of the invention. A write command is received at step 1302. Next, at step 1304, one or more commands are divided into one or more sub-commands based on the granularity of the SLBA table. That is, the host LBAs associated with the one or more commands are divided. The combination of commands may have some common LBAs or consecutive LBAs. Next, at step 1306, the sub-commands are assigned to SSDs independently of the received command thereby causing striping of the command across the SSDs. At step 1308, the storage processor 10 creates NVMe command structures for each sub-command in the submission queues of corresponding SSDs. The process ends at step 1310.

Figure 14:
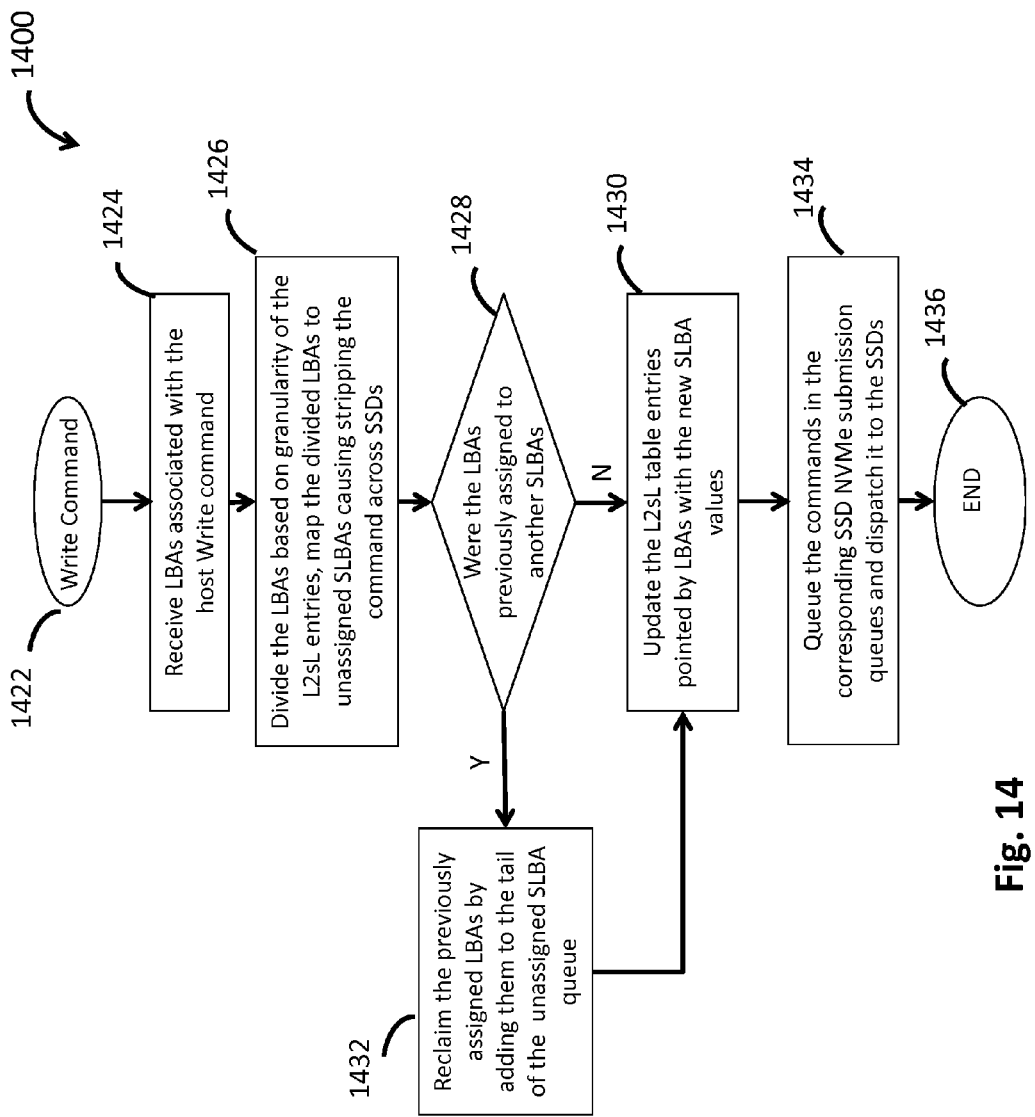
FIG. 14 shows a more detailed flow chart 1420 of the relevant steps performed by the CPU subsystem 14 during a write operation, in accordance with a method of the invention.

FIG. 14 shows a more detailed flow chart 1400 of the relevant steps performed by the CPU subsystem 14 during a write operation, in accordance with a method of the invention. A write command is received at 1022. Next, at step 1424, the host LBAs corresponding to the write command are received.

Next, at step 1426, the host LBA(s) of the received command is divided into one or more sub-commands based on the number of sector count and granularity of the L2sL table (table 22 for example). The divided sub-commands are mapped to unassigned SLBAs from the SSD unassigned SLBA queue causing striping of the command across SSDs.

Next, at 1428, a determination is made as whether or not the LBAs from the host have been previously mapped or assigned to SLBAs and if so, the process continues to step 1432 and if not, the process continues to step 1430. At step 1432, the previously-assigned SLBAs are reclaimed and added to the tail pointer of the corresponding pool of unassigned SLBA queues and the process continues to the step 1430. At step 1430, the L2sL table entries pointed to by the LBAs are updated with new SLBA values from step 1426. Lastly, at step 1434, the storage processor 10 creates NVMe command structures for each sub-command in the submission queues of the corresponding SSDs. At 1436, the writing process ends.

Figure 15:
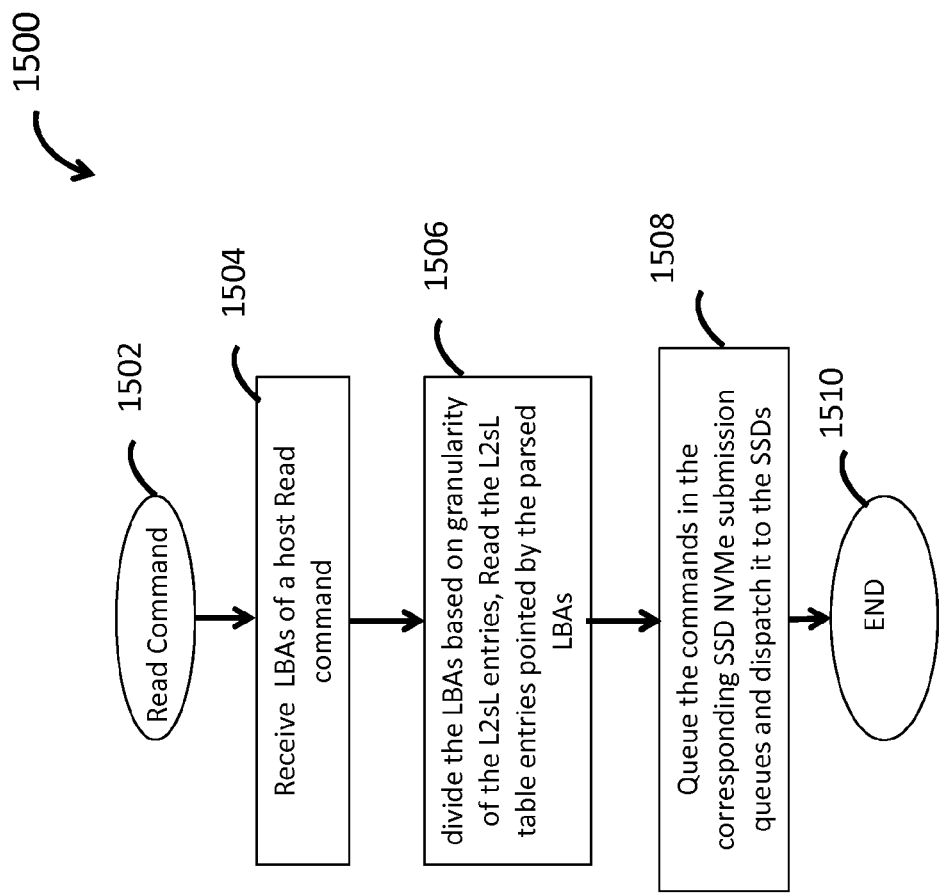
FIG. 15 shows a flow chart 1500 of the relevant steps performed by the storage processor 10 during a read operation, in accordance with a method of the invention.

FIG. 15 shows a flow chart 1500 of the relevant steps performed by the storage processor 10 or CPU subsystem 14 during a host read operation, in accordance with a method of the invention. At 1502, the read operation begins. At step 1504, host LBAs corresponding to the read command are received from the host. Next, at step 1506, the received command is divided into one or more sub-commands based on the sector count, the granularity of the L2sL. Subsequently, the SLBA values in the L2sL table pointed by the host LBAs of the sub-command, are read. Next, at step 1508, the storage processor 10 creates NVMe command structures for each sub-commands in the submission queues of the corresponding SSDs, corresponding to the read command, for execution thereof. The process ends at 1510. In the event the storage processor 10 fails to find any entry in the L2sL table corresponding to the host LBAs associated with the sub-command, the processor generates a read error to the host indicating invalid read.

In one embodiment of the invention, the granularity of the SLBAs maintained in the SSD unassigned queues and the L2sL table are the same. In another embodiment, the granularity of the SLBAs and the L2sL table matches the granularity at which the SSDs maintain theirs logical to physical tables.

Although the invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claims is:

1. A method of writing to two or more solid state disks (SSDs) employed by a storage processor, the method comprising:
    receiving one or more commands from a host, the one or more commands having host logical block addresses (LBAs), a portion of the one or more commands defining a sub-command, the portion of the one or more commands excluding the host LBAs;
    assigning a queue to each distinct SSD of the two or more SSDs, each queue having entries and each entry holding an unassigned SSD LBA (SLBAs), wherein each entry of each of the queues forming a stripe;
    assigning a distinct unassigned SLBA of a stripe to each of a plurality of sub-commands, the plurality of sub-commands being associated with a command of the one or more commands and based on a granularity;
    continuing assigning remaining sub-commands of the command to unassigned SLBAs of the stripe until the stripe includes only assigned sub-commands before starting another stripe, each of the unassigned SLBAs belonging to a different SSD of a stripe thereby causing striping across all of the SSDs of the stripe before causing striping across a next stripe, wherein the SLBAs assigned to sub-commands having no relationship to the host LBAs;
    wherein a SLBA assigned to a sub-command is different from a previously-assigned SLBA of the same sub-command; and
    creating a Non-Volatile Memory Express (NVMe) command structure for each sub-command.

2. The method of writing, as recited in claim 1, further including maintaining a list of unassigned SLBAs.

3. The method of writing, as recited in claim 2, wherein the host LBAs are each divided into one or more LBAs based on a granularity and assigning each of the divided LBAs to an unassigned SLAB.

4. The method of writing, as recited in claim 3, wherein the NVMe command structure includes one of the SLBAs.

5. The method of writing, as recited in claim 4, further including maintaining the assignment of the host LBAs and SLBAs.

6. The method of writing, as recited in claim 1, wherein the queues are circular buffers, with each circular buffer having a head pointer and tail pointer.

7. The method of writing, as recited in claim 6, further including pointing to unassigned SLBAs of each of the queues by their corresponding head pointer.

8. The method of writing, as recited in claim 1, further including receiving data associated with the one or more commands from the host and further dividing the data into one or more sub-data based on a granularity, with each divided sub-data being associated with a sub-command.

9. The method of writing, as recited in claim 8, further including the NVMe command structure pointing to a sub-data of a sub-command.

10. The method of writing, as recited in claim 9, wherein the storage processor includes memory and the memory includes non-volatile memory and further maintaining the L2sL table in the non-volatile memory.

11. A method of writing to two or more solid state disks (SSDs) employed by a storage processor, the method comprising:
    receiving one or more commands from a host, the one or more commands having host logical block addresses (LBAs),
    assigning a queue to each distinct SSD of the two or more SSDs, each queue having entries and each entry holding an unassigned SSD LBA (SLBAs), wherein each entry of each of the queues forming a stripe;
    assigning a distinct unassigned SLBA of a stripe to each of a plurality of sub-commands, the plurality of sub-commands being associated with a command of the one or more commands and based on a granularity;
    continuing assigning remaining sub-commands of the command to unassigned SLBAs of the stripe until the stripe includes only assigned sub-commands before starting another stripe, each of the unassigned SLBAs belonging to a different SSD of a stripe thereby causing striping across all of the SSDs of the stripe before causing striping across a next stripe, wherein the SLBAs assigned to sub-commands having no relationship to the host LBAs;

wherein a SLBA assigned to a sub-command is different from a previously-assigned SLBA of the same sub-command; and creating a Non-Volatile Memory Express (NVMe) command structure for each sub-command.

12. The method of writing, as recited in claim 11, further including maintaining a list of unassigned SLBAs.

13. The method of writing, as recited in claim 12, wherein the host LBAs are each divided into one or more LBAs based on the granularity and assigning each of the divided LBAs to an unassigned SLBA.

14. The method of writing, as recited in claim 13, wherein the NVMe command structure includes the SLBA assigned to a corresponding sub-command.

15. The method of writing, as recited in claim 14, further including maintaining the assignment of the unassigned SLBA to the divided LBAs in a logical to SSD logical (L2sL) table.

16. The method of writing, as recited in claim 11, wherein the queues are circular buffers, with each circular buffer having a head pointer and a tail pointer.

17. The method of writing, as recited in claim 16, wherein performing the striping across the two or more SSDs by using an unassigned SLBA from each of the queues pointed to by the queue's corresponding head pointer.

18. The method of writing, as recited in claim 11, further including receiving data associated with a command of the one or more commands from the host and further dividing the data into one or more sub-data based on the granularity, with each divided sub-data being associated with a sub-command.

19. The method of writing, as recited in claim 18, wherein the NVMe command structure pointing to a sub-data associated with one of the sub-commands of the command.

20. The method of writing, as recited in claim 11, wherein the storage processor includes memory and the memory includes non-volatile memory and maintaining the L2sL table in the non-volatile memory.

21. A method of writing to two or more solid state disks (SSDs) employed by a storage processor, the method comprising:

receiving one or more commands from a host, the one or more commands having host logical block addresses (LBAs);

assigning a queue to each distinct SSD of the two of more SSDs, each queue having entries and each entry holding an unassigned SSD LBA (SLBAs), wherein each entry of each of the queues forming a stripe;

forming sub-commands from a command from the host, a set of first sub-commands being based on host LBAs and a granularity, the set of first sub-commands defining the number of sub-commands of a set of second sub-commands;

assigning a distinct unassigned SLBAs of a stripe to each of the set of second sub-commands, and continuing assigning remaining second sub-commands to unassigned SLBAs of the stripe until the stripe includes only assigned second sub-commands before starting another stripe, each of the unassigned SLBAs belonging to a different SSD of a stripe thereby causing striping across all of the SSDs of the stripe before causing striping across a next stripe, wherein the SLBAs assigned to second sub-commands having no relationship to the host LBAs;

wherein a SLBA assigned to each sub-command is different from a previously-assigned SLBA of the same sub-command; and upon forming a set of sub-commands that is the same as the set of first sub-commands, assigning a different SLBA to a set of second sub-commands that corresponds to the set of first sub-commands; and creating a Non-Volatile Memory Express (NVMe) command structure for each sub-command.

22. The method of writing, as recited in claim 21, further including maintaining a list of unassigned SLBAs groups that are not assigned to any of the two or more SSDs.

23. The method of writing, as recited in claim 22, wherein the host LBAs are each divided into one or more LBAs based on the granularity and assigning each of the divided LBAs to an unassigned SLBA.

24. The method of writing, as recited in claim 23, wherein the NVMe command structure including the SLBA assigned to the sub-command.

25. The method of writing, as recited in claim 24, further including maintaining the assignment of the unassigned SLBAs and the divided LBAs in a logical to SSD logical (L2sL) table.

26. A method of writing to two or more solid state disks (SSDs) employed by a storage processor, the method comprising:

receiving one or more commands from a host, the one or more commands having host logical block addresses (LBAs), the host LBAs defining a plurality of sub-commands, the sub-commands being based on a granularity;

assigning a queue to a distinct SSD of the two of more SSDs, each queue having entries and each entry holding an unassigned SSD LBA (SLBAs), wherein each entry of each of the queues forming a stripe;

assigning each of the sub-commands to a distinct unassigned SLBA from a different one of the queues of a stripe, the plurality of sub-commands being associated with a command of the one or more commands and based on a granularity;

continuing assigning remaining sub-commands of the command to unassigned SLBAs of the stripe until the stripe includes only assigned sub-commands before starting another stripe, each of the unassigned SLBAs belonging to a different SSD of a stripe thereby causing striping across all of the SSDs of the stripe before causing striping across a next stripe, wherein the SLBAs assigned to sub-commands having no relationship to the host LBAs;

wherein a SLBA assigned to a sub-command is different from a previously-assigned SLBA of the same sub-command; and creating a Non-Volatile Memory Express (NVMe) command structure for each sub-command.

27. The method of writing, as recited in claim 26, further including maintaining a list of unassigned SLBA and further dividing the host LBAs into one or more LBAs based on the granularity and assigning each of the divided LBAs to a unassigned SLBA.

28. The method of writing, as recited in claim 26, wherein the NVMe command structure including the SLBA assigned to the sub-command.

* * * * *